US008593108B2

(12) United States Patent
Ferber et al.

(10) Patent No.: US 8,593,108 B2
(45) Date of Patent: Nov. 26, 2013

(54) PORTABLE CHARGING SYSTEM

(75) Inventors: Roman S. Ferber, West Bloomfield, MI (US); Jeff Wollenzien, Toronto (CA); John Liu, Mississauga (CA); Hing Wah Tsang, Ajax (CA)

(73) Assignee: RFA Brands, LLC, Commerce Township, MI (US)

( * ) Notice: Subject to any disclaimer, the term of this patent is extended or adjusted under 35 U.S.C. 154(b) by 324 days.

(21) Appl. No.: 13/089,001

(22) Filed: Apr. 18, 2011

(65) Prior Publication Data

US 2012/0262116 A1    Oct. 18, 2012

(51) Int. Cl.
*H01M 10/46* (2006.01)
(52) U.S. Cl.
USPC .......................................................... 320/114
(58) Field of Classification Search
USPC .................................. 320/103, 107, 114, 115
See application file for complete search history.

(56) References Cited

U.S. PATENT DOCUMENTS

| 6,434,032 | B1 | 8/2002 | Romano |
| 6,870,089 | B1 | 3/2005 | Gray |
| 6,894,457 | B2 | 5/2005 | Germagian et al. |
| 2006/0226805 | A1 | 10/2006 | Yu |
| 2006/0279250 | A1* | 12/2006 | Keely et al. .................. 320/103 |
| 2008/0210728 | A1* | 9/2008 | Bihn ............................. 224/576 |
| 2009/0224722 | A1* | 9/2009 | Causey ........................ 320/101 |
| 2010/0231161 | A1* | 9/2010 | Brown ......................... 320/101 |
| 2011/0006729 | A1 | 1/2011 | Matthias et al. |
| 2011/0050162 | A1 | 3/2011 | FallHowe |
| 2011/0169451 | A1* | 7/2011 | Stampfli ....................... 320/115 |
| 2012/0229071 | A1* | 9/2012 | Schuessler ................... 320/101 |

OTHER PUBLICATIONS travel.usatoday.com/destinations/.../1, "Backpack promises to charge batteries on the go", 2 pages, Sep. 27, 2010.

* cited by examiner

*Primary Examiner* — Edward Tso
(74) *Attorney, Agent, or Firm* — Brooks Kushman P.C.

(57) ABSTRACT

A portable charging system includes a bag configured to receive an electronic device, a battery, a docking station, a charging apparatus and a cord. Another portable system includes a bag, a charging system, and a cord for charging an electronic device. A battery includes a battery cell for storing energy, an external case surrounding the battery cell, and an electrical contact for transmitting electricity therethrough.

20 Claims, 6 Drawing Sheets

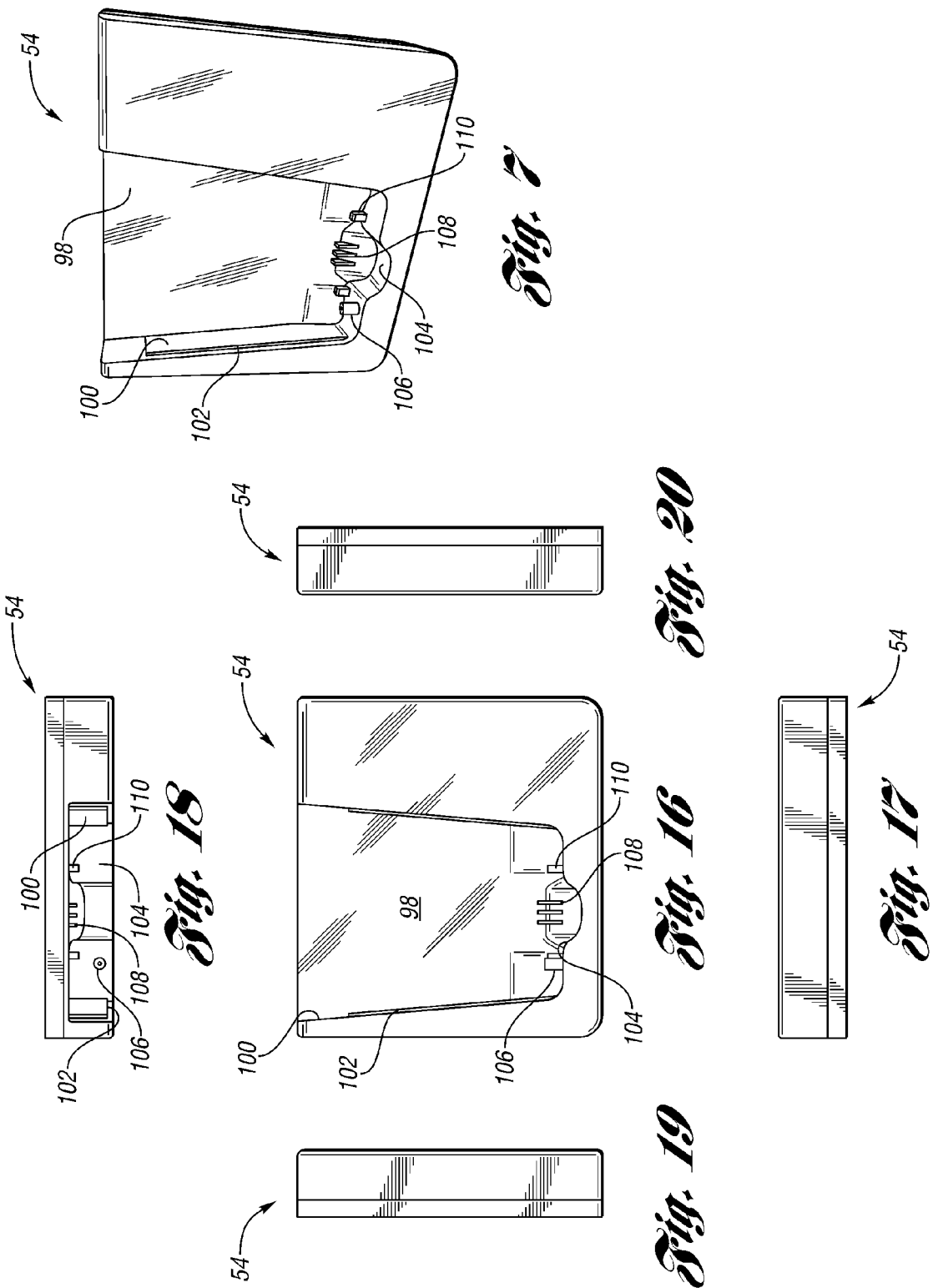

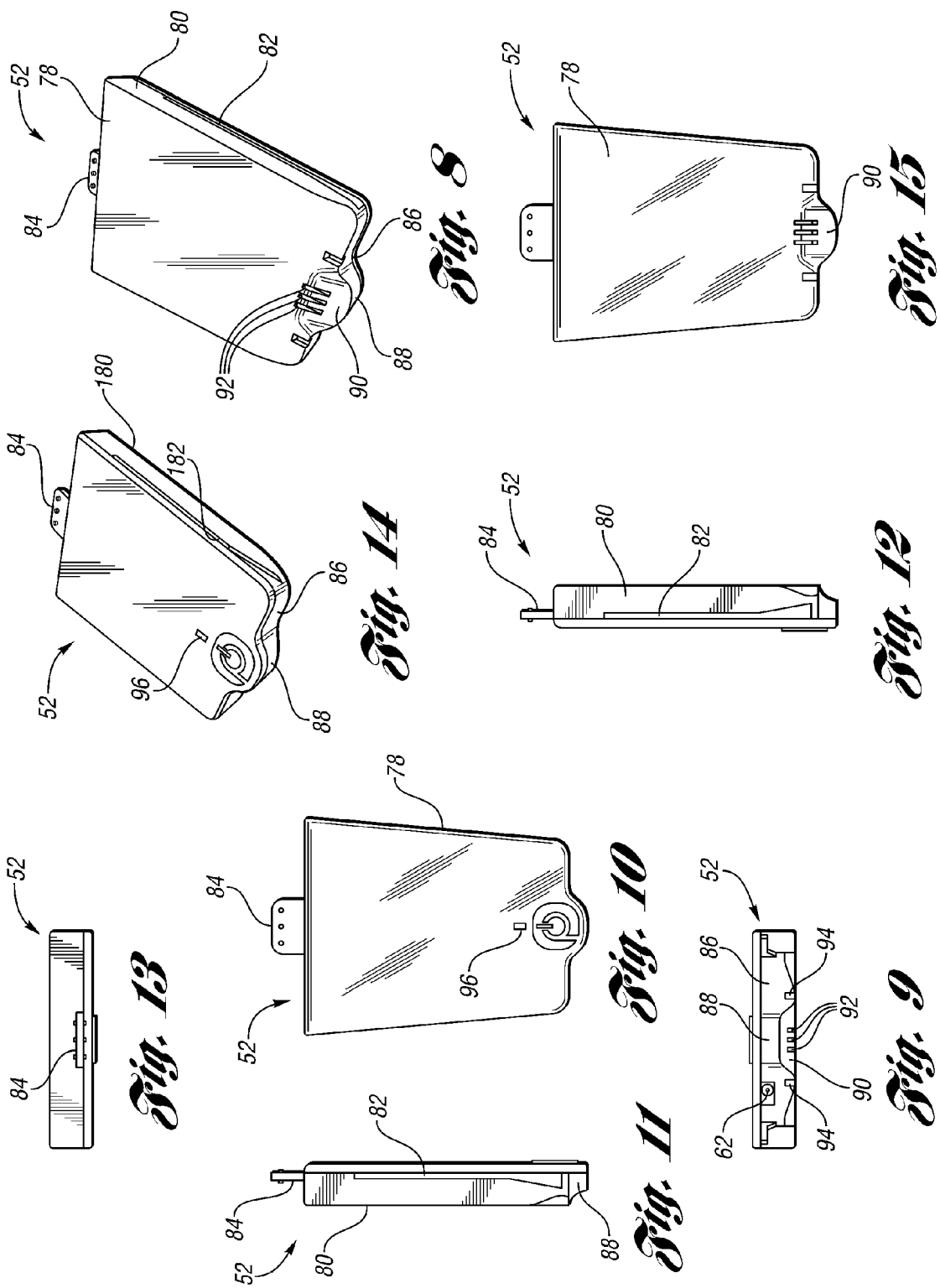

PORTABLE CHARGING SYSTEM

TECHNICAL FIELD

Various embodiments relate to charging systems having a battery for use with luggage and bags, and the bags and luggage pieces containing the systems.

BACKGROUND

Electronic devices have become smaller and more mobile, and the number of electronic devices that a person carries with them has greatly increased in the last few years. Electronic devices include mobile telephones, personal digital assistants, tablets, e-readers, laptops, cameras, portable navigation systems, personal digital music players, handheld game consoles, and the like. Some of the mobile devices have removable rechargeable batteries where the battery is placed into a docking station to be recharged, or alternatively is recharged while located within the device. Others have internal rechargeable batteries which are recharged while located within the device.

SUMMARY

In an embodiment, a portable charging system is provided with a bag having a charging port and configured to receive an electronic device. The portable charging system has a battery with a contoured surface including a protrusion, a recess, and a first electrical contact. The battery has an angled surface having a second electrical contact. A docking station is provided in electrical communication with the charging port. The docking station has a recessed area for receiving the battery, and the recessed area has a bottom surface contoured to receive the contoured surface and angled surface of the battery. The bottom surface has a third electrical contact configured to mate with the second electrical contact of the battery and a fourth electrical contact configured to mate with the first electrical contact of the battery. The bottom surface also has a locator pin to mate with the recess of the battery. A charging apparatus is also provided and has a connector on a distal end configured to plug into an external power supply. The charging apparatus has a second connector on a proximal end configured to connect to one of the charging port of the docking station and the first electrical contact of the battery. A cord is provided in electrical communication with the docking station and located within the bag, and has a connector for charging the electronic device.

In another embodiment, a portable system for charging an electronic device includes a bag, and a charging system located within the bag, where the charging system has a docking station for releasably docking a battery. A cord has a connector in electrical communication with the charging system, and is used for charging an electronic device.

In yet another embodiment, a battery includes a battery cell for storing energy, an external case surrounding the battery cell, and an electrical contact located on the angled surface and in electrical communication with the battery cell, where the contact is for transmitting electricity therethrough. The case has a generally planar surface and a contoured surface which defines a protrusion, with an angled surface extending between the contoured surface and the generally planar surface.

BRIEF DESCRIPTION OF THE DRAWINGS

FIG. 7 is a perspective view of a dock of the charging system of FIG. 5;

FIG. 8 is a perspective view of a battery of the charging system of FIG. 5; and

FIG. 9 is a bottom plan view of the battery of FIG. 8;

FIG. 10 is a front plan view of the battery of FIG. 8;

FIG. 11 is a left side plan view of the battery of FIG. 8;

FIG. 12 is right side plan view of the battery of FIG. 8;

FIG. 13 is a top plan view of the battery of FIG. 8;

FIG. 14 is a another perspective view of the battery of FIG. 8;

FIG. 15 is a rear plan view of the battery of FIG. 8;

FIG. 16 is a front plan view of the dock of the charging system of FIG. 7;

FIG. 17 is a bottom plan view of the dock of the charging system of FIG. 7;

FIG. 18 is a top plan view of the dock of the charging system of FIG. 7;

FIG. 19 is a left plan view of the dock of the charging system of FIG. 7; and

FIG. 20 is a right plan view of the dock of the charging system of FIG. 7.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A bag 20 for use with a portable charging system 22 is illustrated in FIGS. 1-4. The bag 20 is shown as a backpack, however, any bag or piece of luggage is contemplated, including handbags, messenger bags, shoulder bags, roller bags, camera bags, and the like. The bag 20 may be constructed from a nylon material, although it is contemplated that the bag 20 may be made from leather, or another synthetic material.

Figure 1:
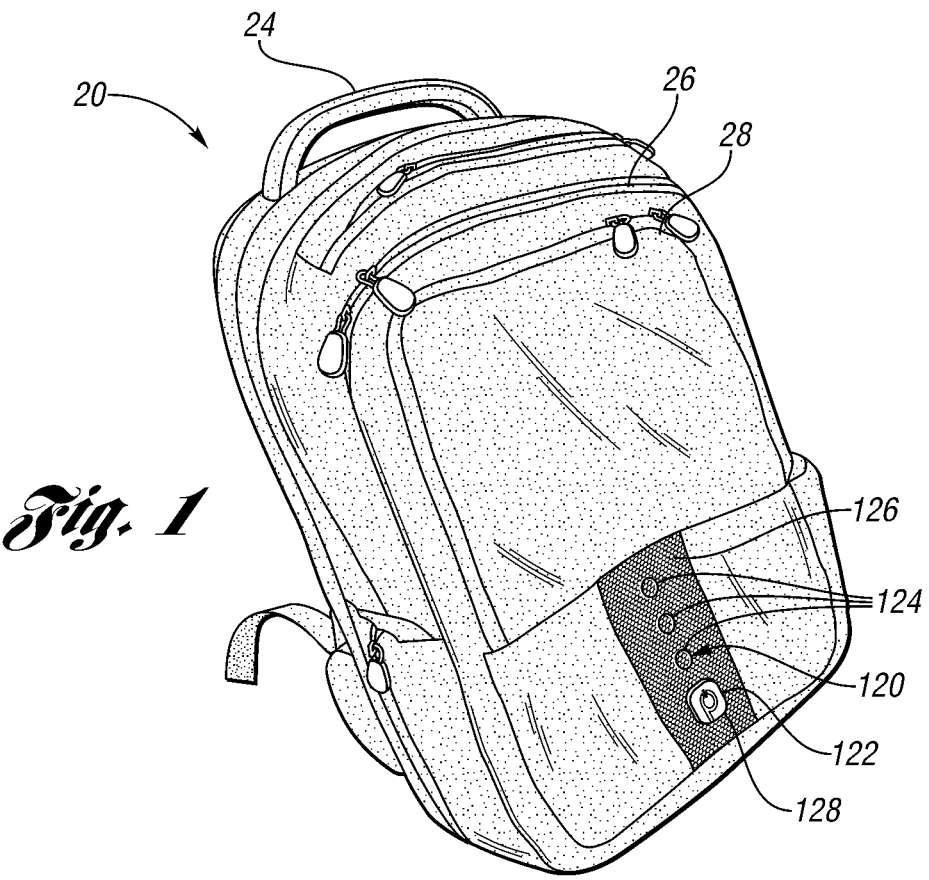
FIG. 1 is a perspective view of a bag having a charging system according to an embodiment.
Figure 3:
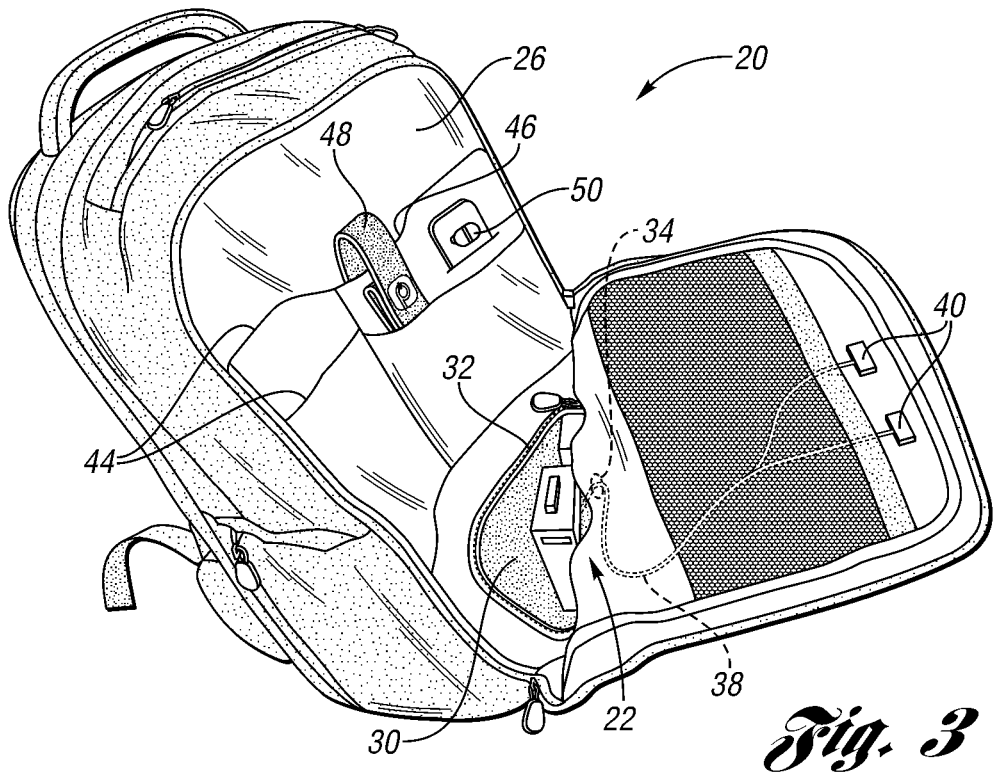
FIG. 3 is another perspective view showing a portion of the interior of the bag of FIG. 1.
Figure 2:
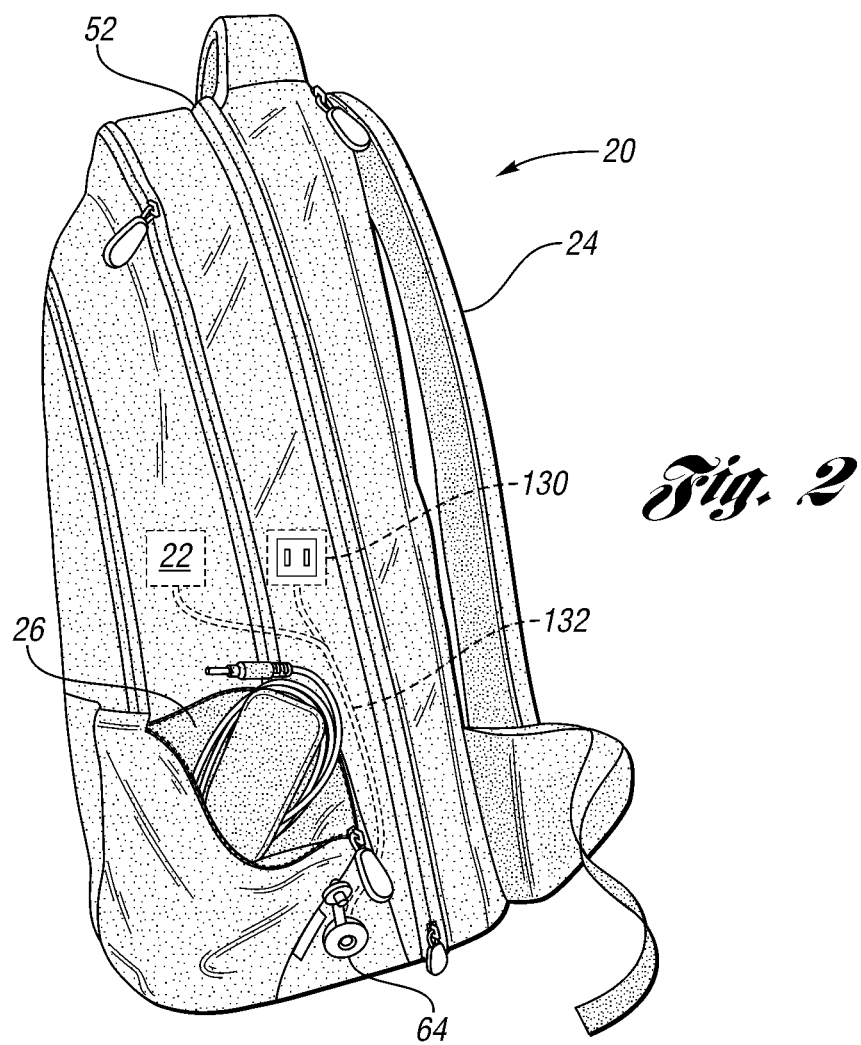
FIG. 2 is a perspective view showing a portion of the interior of the bag of FIG. 1.

With reference to FIGS. 1 and 2, the bag 20 may include a strap system 24, a pocket 26, and a front pocket 28. The strap system 24 allows the user to carry the bag 20, and can be a backpack style strap, a single over the shoulder strap, a double strap, a handle, or the like. Any number of pockets is contemplated, such as a laptop sleeve, a sunglass pocket, and other storage pockets for books, files, and personal belongings. The pocket 26 has an interior charging pocket 30, as shown in FIG. 3. The charging pocket 30 may be sewn or otherwise affixed into the bottom or a side of the pocket 26. Alternatively, the charging pocket 30 may be connected to the interior of the pocket 26 using a zipper, snap, loop and hook, or other fastener.

The pocket 30 has an interior space which may be closed and opened using a fastener 32 such as a zipper, snap, hook and loop, or other fastener. The pocket 30 also may include one or more apertures 34 which allow a cord to pass through. The aperture 34 may be provided at the bottom or rear of the pocket 30, for example, and may be defined by stitching, a grommet, or the like.

Figure 4:
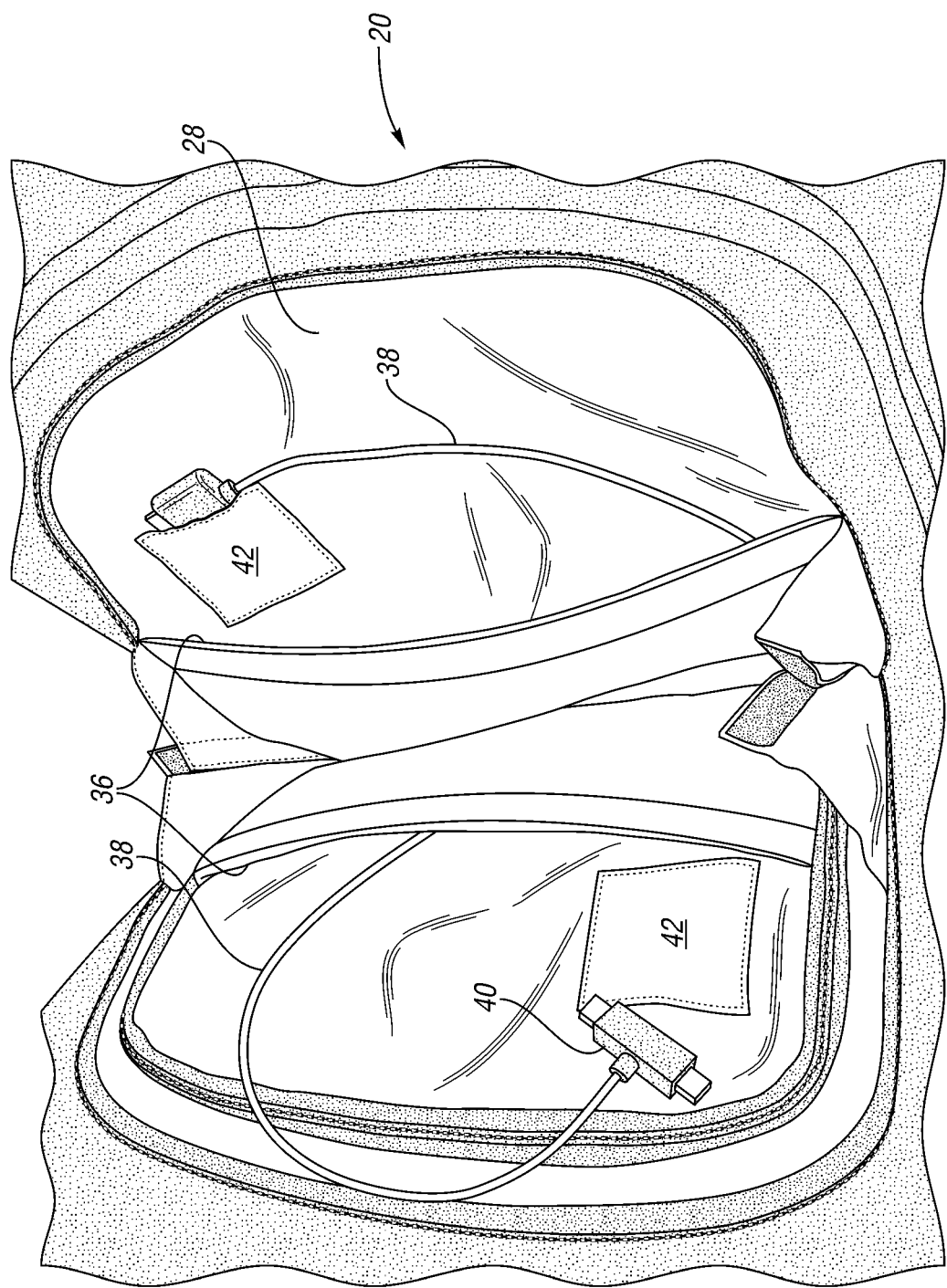
FIG. 4 is yet another perspective view showing a portion of the interior of the bag of FIG. 1.

With reference to FIG. 4, the pocket 28 is closed using a fastener such as a zipper, snap, or the like. The pocket 28 may have one or more compartments 36 where mobile electronic devices may be stored. The compartments 36 may be the same size or different sizes, and have a felt, fleece or other lining to protect the mobile devices. Cords 38 with various charging connectors 40 are run from the charging system 22 in the charging pocket 30 through the aperture 34 and internally in the bag 20 to an aperture in the compartments 36. The cords 38 carry electricity for recharging the mobile devices using power in the charging system 22. Various connectors 40 are available for use with the bag, such as USB, mini-USB, micro-USB, and other pin or docking connectors as are known in the art. The compartments 36 may each have a connector pocket 42. The connector 40 fits inside the pocket 42 and may be placed there when it is not connected to a mobile device. The pocket 42 allows the connector 40 to be stored and easily located by the user within the compartment 36.

As shown in FIG. 3, the pocket 26 may also have additional compartments 44 for mobile devices or other personal objects. A compartment 46 is shown sized for a tablet, a netbook, or other device and may have a closure 48 to hold the device in place. The closure 48 is shown as a strap with a hook and loop fastener, although other types of closures and fasteners are contemplated. A clip 50 may be attached to the bag 20 in the pocket 26 and is used to retain a cord for use in charging a mobile device in the compartment 46. The clip 50 may be made from silicone, or another resilient material, such that the cord may be easily put into and removed from the clip 50 by a user. The cord runs from the charging system 22 out of the pocket 30, through the clip 50 and to a device in the compartment 46, or another compartment 44 within the pocket 26.

One or more devices may be charged at a given time within the bag 20 using power from the charging system 22. For example, multiple devices may be placed in compartments in various pockets 26, 28 and connected to the charging system 22 to charge simultaneously. Alternatively, a single device may be charged within the bag 20 by the charging system 22.

Figure 5:
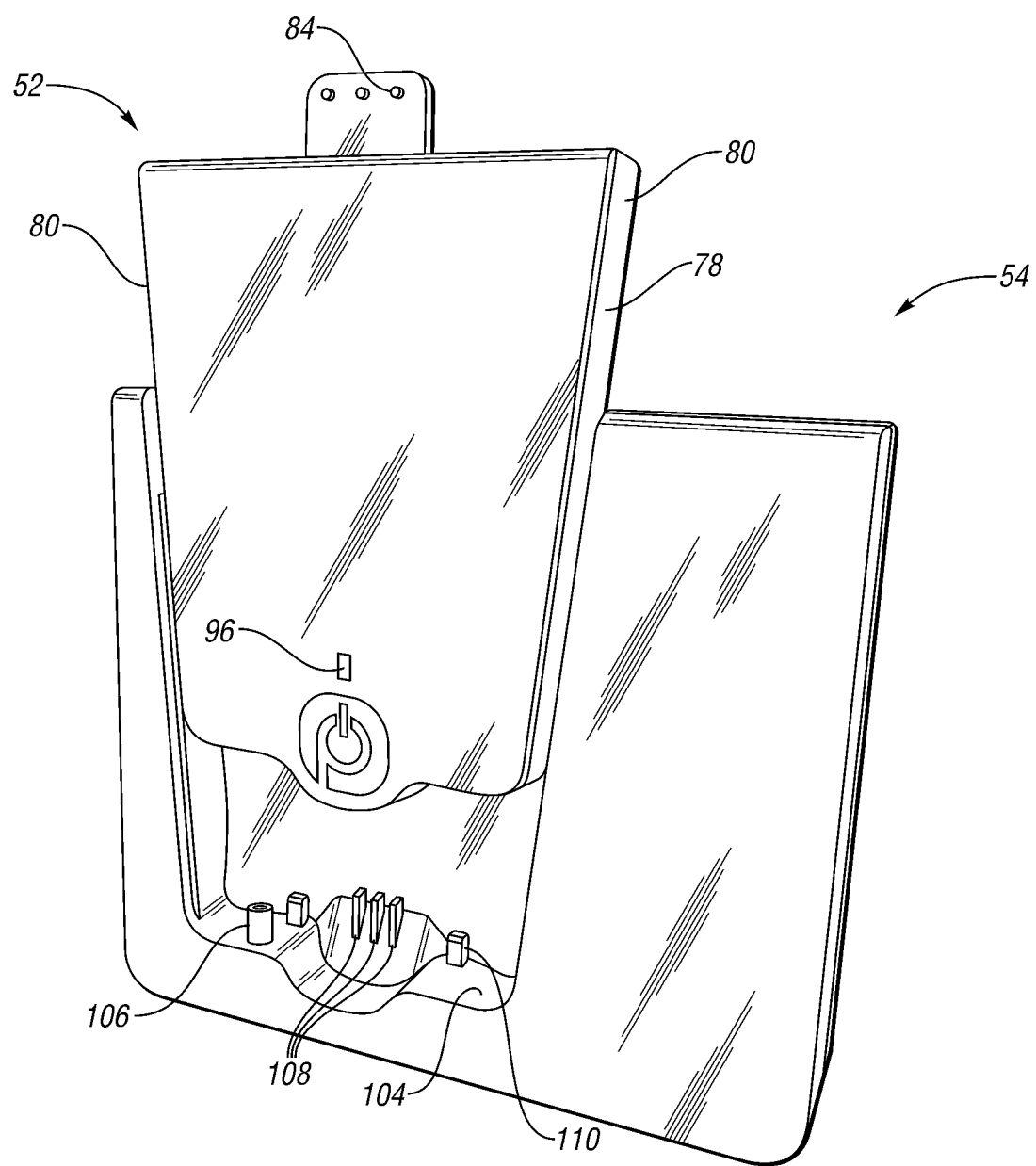
FIG. 5 is a perspective view of a charging system according to an embodiment.

The charging system 22, as shown in FIGS. 3 and 5, is sized to be received within the charging pocket 30. The charging system 22 has a battery 52 and a docking station 54. The battery 52 snaps, clips, or otherwise removeably attaches to the docking station 54. The battery 52 is a lithium ion, nickel metal hydride, or other rechargeable battery, and may have a single cell, or multiple cells.

Figure 6:
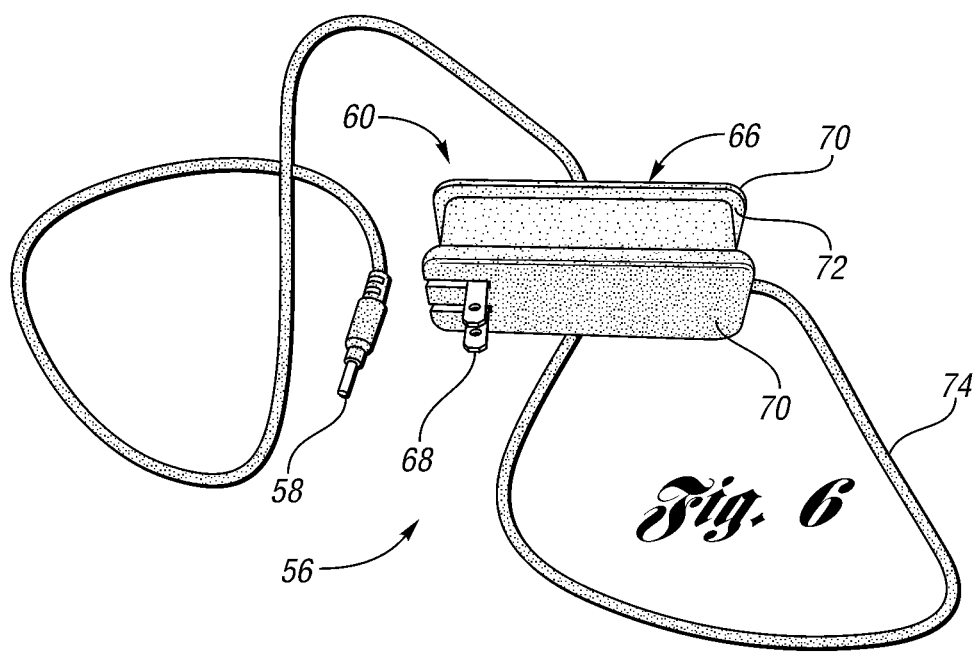
FIG. 6 is a perspective view of a power cord for use with the charging system of FIG. 5.

With reference to FIG. 6, a charging apparatus 56 is used to charge the battery 52. The apparatus 56 has a connector 58, a cord 74, and a plug 60. The male connector 58 is sized to fit into a female connector 62 located on the battery 52 (see FIG. 9), or into a female connector 64 located on the bag 20 (see FIG. 2). The plug 60 has a body 66 and a pair of metal prongs 68, and is used with a 110 V or 220 V outlet. The prongs 68 may be folded into the body 66 to create a more compact plug 60 for storage. The body 66 may have a pair of outer plates 70 with an inner portion 72 which creates a circumferential recess on the body 66 to wrap the cord 74 for storage.

The apparatus 56 is shown in a wrapped storage configuration in FIG. 2. An outer pocket 76 may be located on the bag 20 for storage of the apparatus 56. The pocket 76 is shown as adjacent to the female connector 64 for ease of use. The pocket 76 may have a zipper or other fastener to open and close the pocket 76.

In other embodiments, the apparatus 56 has a direct current (DC) connector in place of the metal prongs 68, such that the apparatus 56 may be plugged into a car or other source of DC power for charging the battery 52 in the charging system 22, or for charging of the devices. In some embodiments, the bag 20 is supplied with both styles of apparatuses 56.

The apparatus 56 may be used to charge the battery 52 when the battery 52 is sitting by itself on a counter, table, or the like, by directly plugging the connector 58 into the female connector 62 on the battery 52 (see FIG. 9).

The charging apparatus 56 may be used to charge the battery 52 when the battery 52 is located in the docking station 54 in the bag 20 by plugging the connector 58 into the connector 64 on the bag 20. An internal cord runs from the connector 64 through the interior of the bag 20 and is connected to the docking station 54. Therefore, the charging apparatus 56 can transfer electricity from a wall outlet through the apparatus 56, through the connector 64, through an internal cord in the bag 20, to the docking station 54, and to the battery 52 in the station 54. This allows the battery 52 to be recharged without removing it from the bag 20 and without having to open a bag containing the charging system 22. The user opens the pocket 76 containing the charging apparatus 56, and plugs the plug 60 into a wall outlet, and inserts the connector 58 into the connector 64 on the bag 20. This configuration may also be used to directly charge mobile devices when the mobile devices are being stored within the bag 20 and are connected to the charging system 22 using the respective cords 38, without having to remove devices or open the main pockets and compartments of the bag 20 and permit charging of multiple devices using only one apparatus 56 and one wall outlet.

When the battery 52 has a partial or full charge and is located within the charging system 22, any mobile devices in the bag 20 and connected to the charging system 22 are being charged.

An additional docking station 54 may be available for charging the battery 52 externally to the bag 20, or to charge a spare battery 52 for use with the charging system 22. An additional docking station 54 may be kept at an office or at home, and sit on a desk or a countertop, for example. The use of multiple batteries 52 allows for greater charging of the mobile devices within the bag 20 without access to a wall outlet.

One non-limiting embodiment of the battery 52 is shown in FIGS. 5 and 8-15. The battery 52 may have a body portion 78 with a pair of non-parallel sides 80, which cause the battery 52 to have a tapering or generally trapezoidal appearance. A groove 82 may be located along each side 80. A tab 84 may be connected to the body portion 78 to provide a grasping place for a user when sliding the battery 52 into and out of the docking station 54. The bottom side 86 of the battery 52 may have a contoured surface. A central protrusion 88 may be provided on the battery 52 which mimics or generally corresponds with the shape of a logo.

As shown in FIG. 8, an angled surface 90 may extend from the bottom surface 86 to the back of the body portion 78. Contacts 92 are located on the angled surface 90, and may be an interference type contact interface. A pair of recesses 94 and a female connector 62 are located on the bottom portion 86 of the battery 52 (see FIG. 9). Other shapes and sizes of batteries are contemplated.

Batteries with different storage capacities (e.g. amp hours) may be available for use with the charging system 22. As the capacity of the battery increases, the thickness or length of the battery may increase. For example, either the length or width dimension of the sides 80 of the battery 52 may increase.

As shown in FIG. 5, a light 96 is located on the front of the body portion 78. The light 96 may indicate one color, such as amber, when the battery 52 is being charged and has a partial charge, and indicate another color, such as green, when the battery 52 is being charged and has reached a full charge.

One non-limiting embodiment of the docking station 54 is shown in FIGS. 5, 7, and 16-20. The docking station 54 has a recessed area 98 which is sized to receive the battery 52. The recessed area 98 is defined by a pair of sides 100 which may each have a ridge 102. The angle and spacing of the sides 100 corresponds to the battery 52 sizing and shape. The ridges 102 interact with the grooves 82 such that the battery 52 slides into the recessed area 98 and is constrained to one degree of motion. The bottom surface 104 of the recessed area 98 is contoured to mimic the bottom side 86, protrusion 88, and angled surface 90 of the battery 52. The use of the shaped bottom 86 with the protrusion 88, the angled surface 90, the contacts 92, and the recesses 94 on the battery 52 provide that only specific batteries can fit into the docking station 54. This provides for quality control of the battery 52 and permits the use of batteries with approved voltage and amperage characteristics to be used safely with the charging system 22.

With reference to FIGS. 5 and 9, a connector 106 on the docking station 54 contacts the connector 62 of the battery 52 to electrically connect the battery 52 to the docking station 54 for charging the battery 52 or powering devices. The connector 106 may be a barrel type connector. Contacts 108 on the docking station 54 are in contact with the contacts 92 of the battery 52, such as meshing therewith in an interference fit, to additionally electrically connect the battery 52 to the docking station 54 for charging the battery 52 or powering devices. Locator pins 110 may be provided to interact with the recesses 94 on the battery 52 to additionally locate the battery 52 within the docking station 54. The locator pins 110 may have a circular, rectangular, semi-circular, or other cross section.

In other embodiments, a magnet may be built into the battery 52 with a magnetic switch built into the docking station 54, or vice versa. The magnet activates the switch within the docking station 54 when the battery 52 is slid into the station 54, and only permits charging of the battery 52 and charging of any devices attached to the charging system 22 if the magnetic switch is activated. In other embodiments, an integrated circuit may be placed inside the battery 52 such that the docking station 54 recognizes and only operates with a battery 52 containing the circuit.

A light module 120, shown in FIG. 1, is connected to the charging system 22. The light module 120 has a tactile button 122 and a series of lights 124. The lights 124 are a series of light emitting diodes, or other light sources. Three lights 124 are shown on the bag 20, although any number of lights is contemplated. The lights 124 may be located beneath a mesh panel 126 on the bag 20 such that light from the lights 124 is diffused through the mesh panel 126 and visible to a user.

When a user activates the button 122, the light module 120 checks the amount of the battery charge of a battery 52 in the charging system 22, and various light configurations occur to notify the user of the state of the charging system 22. If there is no battery 52 located within the charging system 22, the lights do not turn on. If there is no charge in the battery 52, the light module 120 may be configured such that the lights 124 do not turn on, or flash a predetermined number of times, or appear as a certain color, such as amber, for a predetermined amount of time, e.g. ten seconds. If there is a partial charge in the battery 52, some of the lights 124 are illuminated to indicate the amount of charge (i.e. one light illuminates out of the three to indicate approximately a one third charge level), and the lights 124 may illuminate as a different color, such as blue. If there is a full charge in the battery 52, all of the lights 124 are illuminated for a predetermined time to indicate a full charge, e.g. three lights illuminate, and the lights 124 may illuminate as a specified color, such as blue. If the button 122 is activated while the charging system 22 is connected to a wall outlet or other external power source, all of the lights 124 may illuminate and flash a number of times, or a scrolling, sequential illumination of the lights 124 may occur.

In other embodiments, a laptop or other device may be placed in another pocket 52, or alternatively into one of the pockets 26, 28, which has been configured to receive one. The laptop may be connected to the charging system 22 using a cord with the appropriate connector, and be charged using pass through charging when the cord is plugged into an external power source.

Alternatively, the bag 20 may contain an alternating current (AC) female plug receptacle 130 within one of the pockets 26, 28, 52, or anywhere else on the bag 20, such that an electronic device power cord, such as a laptop AC power cord, may be plugged into the AC receptacle 130 within the bag 20 and connected to the electronic device, such as the laptop. Alternatively, a camera bag, or AC charger for a camera or camera battery, may be used with the AC receptacle 130. Of course, any AC charger for a device is contemplated for use with the AC receptacle 130. The charging apparatus 56 may connect to the connector 64 when it is plugged into an external power source, such as a AC power outlet, and an internal cord splitter 132 may be provided to route power to the AC receptacle 130 and/or to the charging system 22, such that the laptop or a camera, the battery 52, and/or the other devices may be charged.

The ability to have connectors directly connected to the charging system 22, as well as a AC cord for a device plugged into the AC receptacle 130 provides ease of use for a user. The user can charge multiple devices using the charging system 22 and the AC receptacle 130 without managing cords for multiple devices and without the need for multiple AC wall outlets. The user can charge multiple devices using power in the battery 52 of the charging system 22, or by plugging the bag 20 into a wall outlet using the charging apparatus 56.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A portable charging system comprising:
    a bag having a charging port, the bag configured to receive an electronic device;
    a battery having a contoured surface including a protrusion, a recess, and a first electrical contact, the battery having an angled surface having a second electrical contact;
    a docking station in electrical communication with the charging port, the docking station having a recessed area for receiving the battery, the recessed area having a bottom surface contoured to receive the contoured surface and angled surface of the battery, the bottom surface having a third electrical contact configured to mate with the second electrical contact of the battery and having a fourth electrical contact configured to mate with the first electrical contact of the battery, the bottom surface having a locator pin to mate with the recess of the battery;

a charging apparatus having a connector on a distal end configured to plug into an external power supply, the charging apparatus having a second connector on a proximal end configured to connect to one of the charging port of the docking station and the first electrical contact of the battery; and a cord in electrical communication with the docking station and located within the bag, the cord having a connector for charging the electronic device.

2. The portable charging system of claim 1 wherein the battery has a pair of sides, each side defining one of a groove and a ridge; and wherein the recessed area of the docking station defines a pair of the other of a groove and a ridge such that the grooves and ridges are configured to engage such that the battery slides during insertion to and removal from the docking station.

3. The portable charging system of claim 1 further comprising a second cord in electrical communication with the docking station and located within the bag, the second cord having a second connector for use in charging another electronic device.

4. A portable system for charging an electronic device comprising:

a bag;

a charging system located within the bag, the charging system having a docking station for releasably docking a battery; and a cord having a connector in electrical communication with the charging system, the connector for charging an electronic device.

5. The system of claim 4 further comprising a power connector located on an outside surface of the bag and in electrical communication with the charging system.

6. The system of claim 5 further comprising a charging apparatus having a plug and a second power connector, the plug adapted to connect with an outside power supply, the second power connector mating with the first power connector, the charging apparatus configured to supply power to the charging system.

7. The system of claim 4 wherein the bag has a pocket sized for receiving the charging apparatus, the pocket adjacent to the first power connector.

8. The system of claim 5 wherein the bag further comprises an alternating current receptacle positioned within the bag and in electrical communication with the power connector.

9. The system of claim 4 wherein the cord has a second connector in electrical communication with the charging system, the second connector for charging another electronic device.

10. The system of claim 4 further comprising a second cord having a second connector in electrical communication with the charging system, the second connector for charging another electronic device.

11. The system of claim 4 wherein the charging system has a port configured to receive a device charging cord.

12. The system of claim 11 wherein the bag has a pocket sized to receive the electronic device and a clip to retain the device charging cord.

13. The system of claim 4 further comprising a light module in electrical communication with the charging system and configured to provide information regarding a state of the charging system, the light module having a tactile button and a light, wherein the tactile button activates the light module and the light is positioned to be visible on an outer surface of the bag.

14. A battery comprising:

a battery cell for storing energy;

an external case surrounding the battery cell, the case having a generally planar surface and a contoured surface which defines a protrusion, the case having an angled surface extending between the contoured surface and the generally planar surface; and an electrical contact located on the angled surface and in electrical communication with the battery cell, the contact for transmitting electricity therethrough.

15. The battery of claim 14 wherein the contoured surface of the external case defines at least one positioning recess.

16. The battery of claim 14 further comprising a second electrical contact located on the contoured surface for transmitting electricity therethrough.

17. The battery of claim 14 wherein the external case has a pair of opposed nonparallel sides, wherein the angled surface and the generally planar surface are interposed between the sides.

18. The battery of claim 17 wherein each nonparallel side defines one of a groove and a ridge.

19. The battery of claim 14 further comprising a tab extending from a surface opposed to the bottom surface of the case.

20. A system for charging an electronic device comprising:

a bag configured to store an electronic device;

a removable battery according to claim 14; and a docking station having a cord for charging the electronic device, the docking station having a recessed area for receiving the battery and a bottom surface contoured to receive the contoured surface and angled surface of the battery, the docking station having a contact to mate with the first contact of the battery, having a power input connector, and having a power output connector.

* * * * *